United States Patent
Franceschi

(10) Patent No.: US 6,321,196 B1
(45) Date of Patent: Nov. 20, 2001

(54) PHONETIC SPELLING FOR SPEECH RECOGNITION

(75) Inventor: Carlos Antonio Franceschi, Marietta, GA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/346,355

(22) Filed: Jul. 2, 1999

(51) Int. Cl.[7] .................... G10L 15/06; G10L 15/04; G10L 15/28; G10L 15/22

(52) U.S. Cl. .................... 704/243; 704/244; 704/251; 704/231

(58) Field of Search .................... 704/231, 235, 704/270, 243, 251, 244

(56) References Cited

U.S. PATENT DOCUMENTS

| | | | |
|---|---|---|---|
| 4,164,025 | * 8/1979 | Dubnowski et al. | 364/900 |
| 4,653,100 | * 3/1987 | Barnett et al. | 381/52 |
| 5,283,833 | * 2/1994 | Church et al. | 381/41 |
| 5,752,232 | * 5/1998 | Basore et al. | 704/275 |
| 5,890,117 | * 3/1999 | Silverman | 704/260 |
| 5,995,934 | 11/1999 | Tang | 704/270 |
| 6,163,767 | 12/2000 | Tang et al. | 704/231 |

FOREIGN PATENT DOCUMENTS

676883 * 2/1995 (EP) .................... H04M/3/42

OTHER PUBLICATIONS

DragonDictate 2.5™ ("User's Guide," © 1986–1996 Dragon Systems Inc.).*
JustVoice™ ("Voice Recognition for Microsoft Windows™ 3.1," © May 1994 Interactive Products Inc.).*
VoiceAssist™ ("User's Guide," © Jul. 1993 by Creative Technology Inc.).*
Talk>To Plus™ ("User's Guide," © Dragon Systems, Inc 1992–1993).*
PlanIt™ ("User's Guide," © 1993 Iguana Corp.).*
Voice Blaster™ ("Owner's Manual," © Feb. 1993, Covox, Inc.).*
VoiceXpress™ ("Installation & Getting Started Guide," © 1992–1997, Lernout & Hauspie Speech Products N.V.).*
Thompson, B., "Quarterly Computing Software Shortcuts." Communications Quarterly, Spring 1996, pp. 85–88.*

* cited by examiner

*Primary Examiner*—Richemond Dorvil
*Assistant Examiner*—Daniel A Nolan
(74) *Attorney, Agent, or Firm*—John R. Pivnichny

(57) ABSTRACT

Speech recognition apparatus includes means for determining when a speaker desires to spell a first word. The speaker may then say a sequence of words selected from a large vocabulary without being restricted to a pre-specified phonetic alphabet. The apparatus recognizes the spoken words, associates letters with these words and then arranges the letters to form the first word. The speaker may also indicate a desire to stop phonetic spelling. Apparatus may also be used for selecting items from a list.

24 Claims, 3 Drawing Sheets

PHONETIC SPELLING FOR SPEECH RECOGNITION

TECHNICAL FIELD

The invention generally relates to speech recognition devices and methods and in particular to the phonetic spelling of words. Even more particularly it relates to using words from a vocabulary larger than the number of letters in the alphabet to indicate the letters of a phonetically spelled word. The invention also relates to using words from a vocabulary larger than the number of letters in the alphabet to select items from a list where each item is designated with one or more letters.

BACKGROUND OF THE INVENTION

Speech recognition devices have been developed with varying degrees of success. There is great variability in how different speakers pronounce words as well as variability in how an individual speaker pronounces words from one time to another. Current speech recognition technology has not yet been developed to the point of accommodating such variabilities to the extent with which a normal human listener can. For example, speech which is dictated into a mini-cassette recorder and then transcribed by a typist will typically have far fewer errors than if the same text is dictated directly to a current technology speech recognition computer program.

Several methods have been developed to assist the current technology devices in accommodating these variabilities, primarily through use of training. For example, the user may be asked to speak each new word at least once prior to using it. Or the speaker may be asked to read a list of frequently used words to the device. The speaker may be asked to monitor the recognized text and correct errors. All of these methods allow the recognition device to "learn" by adapting to the speaker's variability and in some cases variability between speakers. Nevertheless, it frequently occurs that the best approach for an unrecognized, difficult, or new word is for the speaker to spell it.

In other applications a speaker may select items from a list by saying the name of a letter associated with each item.

However, many of the letters sound very similar and may be confused for each other, even for human listeners. It is therefore known in the art to spell a word phonetically which is meant to indicate using a commonly understood word for each letter in the word to be spelled. For example, one may phonetically spell the work "key" by saying "kilo echo yankee." One may also use a phonetic alphabet when selecting items from a list by using a word from the phonetic alphabet rather than saying the corresponding letter name.

A list of such words, one for each letter, arranged in alphabetical order is commonly known as a phonetic alphabet. Table 1 below lists an example of a phonetic alphabet.

TABLE 1

| A | Alpa | N | November |
|---|---|---|---|
| B | Bravo | O | Oscar |
| C | Charlie | P | Papa |
| D | Delta | Q | Quebec |
| E | Echo | R | Romeo |
| F | Fox-trot | S | Sierra |
| G | Golf | T | Tango |
| H | Hotel | U | Uniform |
| I | India | V | Victor |
| J | Juliet | W | Whiskey |

TABLE 1-continued

| K | Kilo | X | Xray |
|---|---|---|---|
| L | Lima | Y | Yankee |
| M | Mike | Z | Zulu |

Various such alphabets have been developed and used over the years with human listeners, primarily by the military, for clearly communicating over sometimes noisy or unreliable radio or telephone links. The developers of speech recognition devices and programs have likewise incorporated a phonetic spelling feature in their products for word spelling.

Other uses for phonetic spelling in association with speech recognition devices include communicating voice commands to a voice activated device as described by Basore et al. in U.S. Pat. No. 5,752,232, or to retrieve information from a directory, e.g. a telephone directory, in response to a phonetically spelled word as described by Dubnowski et al. in U.S. Pat. No. 4,164,025.

Phonetic spelling may be used to generate an audio output to a human listener in an audio response unit such as described by Barnett et al. in U.S. Pat. No. 4,653,100 and Silverman in U.S. Pat. No. 5,890,117. There is no speech recognition involved in this use of phonetic spelling which is the reverse process of speech generation.

In order to use a phonetic spelling feature, the speaker must have knowledge of the phonetic alphabet. This knowledge is easily learned in a military environment where, for example each signal core soldier is taught the phonetic alphabet as part of his signal core training. Ordinary users of speech recognition software have not been so trained and therefore keep a printed or handwritten list of the phonetic alphabet near their devices for use as necessary. Even so, it is awkward and slow for the ordinary user to visually search through the list for each phonetic word needed to phonetically spell a new word. As indicated above, the need to spell a word occurs more frequently when using current technology speech recognition devices than when dictating to a human transcriber because of the lesser accommodation to variations in pronunciation of the devices, further compounding the awkwardness.

OBJECTS AND SUMMARY OF THE INVENTION

It is therefore a principal object of the present invention to overcome the deficiencies of current technology speech recognition devices noted above by providing a phonetic spelling capability which is easier to use than those known in the art.

It is another object to provide a speech recognition apparatus capable of accepting phonetically spelled words by allowing the user to select phonetic words from a large vocabulary.

It is a further object to provide a method of recognizing phonetically spelled words using a large vocabulary of phonetic words.

It is another object to provide a method of selecting items from a list by speaking words from a large vocabulary of phonetic words.

It is yet another object to provide a computer program product for instructing a processor to recognize phonetically spelled words using a large vocabulary of phonetic words.

These and other objects are attained in accordance with one embodiment of the invention wherein there is provided a speech recognition apparatus, comprising, means for determining when a speaker gives an indication of a desire to phonetically spell a first word, means for recognizing a sequence of words selected form a vocabulary of greater than 26 words and spoken by the speaker after the indication, means for selecting a letter associated with each of the spoken words, and means for arranging the letters to form the first word.

In accordance with another embodiment of the invention there is provided a speech recognition apparatus, comprising, a display for showing items on a list, each item having a designated letter, means for recognizing one or more words selected from a vocabulary of greater than 26 words and spoken by a speaker, means for selecting a letter associated with each of the one or more words, and means for selecting the items on the list for which the designated letter matches the letter associated with each of the one or more words.

In accordance with another embodiment of the invention there is provided a method of recognizing speech, comprising the steps of, determining when a speaker gives an indication of a desire to phonetically spell a first word, recognizing a sequence of words selected from a vocabulary of greater than 26 words and spoken by the speaker after the indication, selecting a letter associated with each of the spoken words, and arranging the letters to form the first word.

In accordance with another embodiment of the invention there is provided a method of recognizing speech, comprising the steps of, displaying items on a list, each item having a designated letter, recognizing one or more words selected from a vocabulary of greater than 26 words and spoken by a speaker, selecting a letter associated with each of said one or more words; and selecting the items on the list for which the designated letter matches the letter associated with each of the one or more words.

In accordance with another embodiment of the invention there is provided a computer program product for instructing a processor to recognize speech, comprising, a computer readable medium, first program instruction means for instructing a processor to determine when a speaker gives and indication of a desire to phonetically spell a first word, second program instruction means for instructing a processor to recognize a sequence of words selected from a vocabulary of greater than 26 words and spoken by the speaker after the indication, third program instruction means for instructing a processor to select a letter associated with each of the spoken words, and fourth program instruction means for instructing a processor to arrange the letters to form the first word, and wherein the program instruction means are recorded on the medium.

In accordance with yet another embodiment of the invention there is provided a computer program product for instructing a processor to recognize speech, comprising, a computer readable medium, first program instruction means for displaying items on a list, each item having a designated letter, second program instruction means for recognizing one or more words selected from a vocabulary of greater than 26 words and spoken by a speaker, third program instruction means for selecting a letter associated with each of the one or more words, and fourth program instruction means for selecting the items on the list for which the designated letter matches the letter associated with each of the one or more words, and wherein the program instruction means are recorded on the medium.

BEST MODE FOR CARRYING OUT THE INVENTION

For a better understanding of the present invention together with other and further objects, advantages and capabilities thereof, reference is made to following disclosure and the appended claims in connection with the above described drawings.

Figure 1:
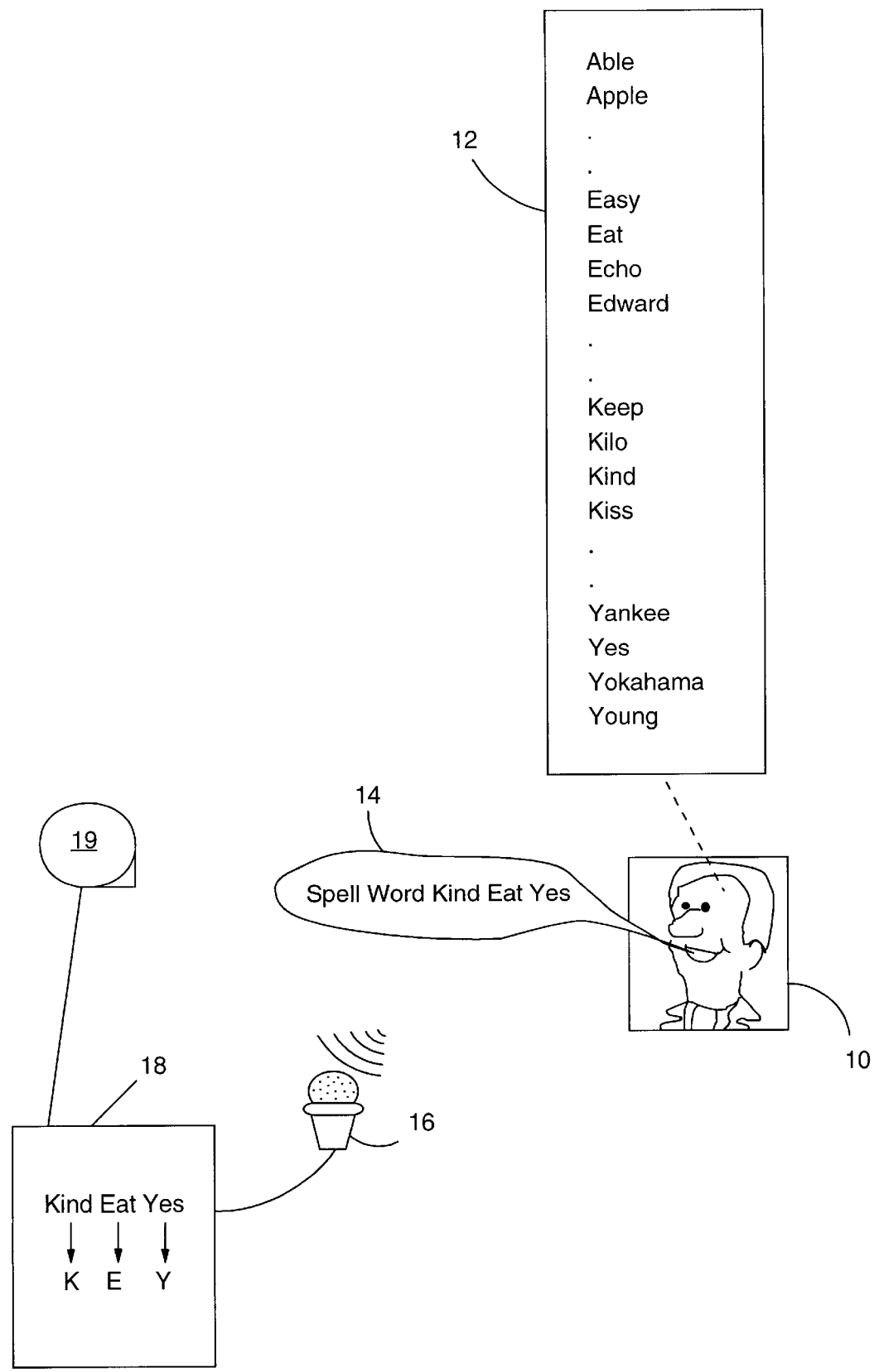
FIG. 1 depicts an embodiment of the apparatus of the present invention.

In FIG. 1 there is shown a speech recognition apparatus. Processor 18 has a microphone 16 attached to pick up the sounds spoken by a speaker 10. The processor may be a general or special purpose computer capable of executing instructions which cause it to perform the steps of the present invention. These steps may be recorded on computer readable medium 19 which may be a floppy or hard drive disk, CD or DVD disk, magnetic tape, optical storage, or other recordable medium used for storing instructions for a processor. Processor 18 may be located near speaker 10, for example, in the speaker's offices or a nearby office. However, processor 18 could also be located a long distance away since it is only necessary that microphone 16 be located near speaker 10 in order to acoustically pick up the sounds, words, and speech spoken by speaker 10.

A vocabulary 12 having more than 26 words is also shown in FIG. 1. Not all of the words are shown but obviously there must be more than one word per letter, for at least one of the 26 letters of the current English (Roman) alphabet. The invention is not envisioned as limited to a particular language, but in fact applies to any language having spelled words. The invention also applies to combinations of languages such as an English vocabulary plus Latin terms as used in the medical or legal profession. The words in vocabulary 12 are shown in alphabetical, order, with breaks for for those words not shown indicated by dots, however they may be arranged in any order such as alphabetical, in order of frequency of use, by order of most recently used, or any other order which facilitates rapid use. In a preferred embodiment vocabulary 12 includes all of the words which processor 18 is capable of recognizing at any point in time that speaker 10 wishes to phonetically spell a word.

Processor 18 can determine when speaker 10 desires to phonetically spell a first word. Speaker 10 may indicate this desire by speaking a specific sequence of words such as SPELL WORD as shown in FIG. 1, or SPELL MODE, of any other sequence of words pre-specified for this purpose. Speaker 10 could also indicate this desire by processing a key on a keyboard attached to processor 18, if so equipped, or by use of a mouse click or by touching a touch sensitive switch or screen. Those skilled in the art will immediately recognize there are numerous equivalent ways for speaker to indicate the desire to phonetically spell a word.

After giving the indication, speaker 10 speaks a sequence of words selected from vocabulary 12 in order to phonetically spell the first word. There is no need for speaker 10 to memorize a phonetic alphabet or consult a printed copy because speaker 10 can select, for example any recognizable words from the vocabulary. Preferably the speech recognition apparatus associates the first letter of each word in the vocabulary as the letter associated with the word.

However, it is not required to associate the first letter. In some applications a letter different from the first may be associated with the word such as z for a word that actually begins with x but where the x is pronounced like a z. It is also possible to associate a single letter to a series of spoken words. Speaker 10 may for example speak the series B AS IN BAKER, O AS IN OCEAN, N AS IN NANCY, D AS IN DOG to phonetically spell the word BOND. In this example processor 18 may recognize all four words in each series and through logic associate a single letter with each series. Fewer spelling errors would normally be expected to occur with this example application than by merely using one word per letter because processor 18 has two words, the letter name and the phonetic word, to use in deciding which letter to select.

Processor 18 also arranges the associated letters to form the first word. Preferably this arrangement is in the same order as the words or plurality series of words are spoken.

Processor 18 may also include an ability to accept an indication of the end of phonetic spelling. This indication may be given by speaker 10 in the same way the indication to start phonetic spelling is described above, however preferably with a different word sequence or different keyboard key or other equivalent means.

Figure 2:
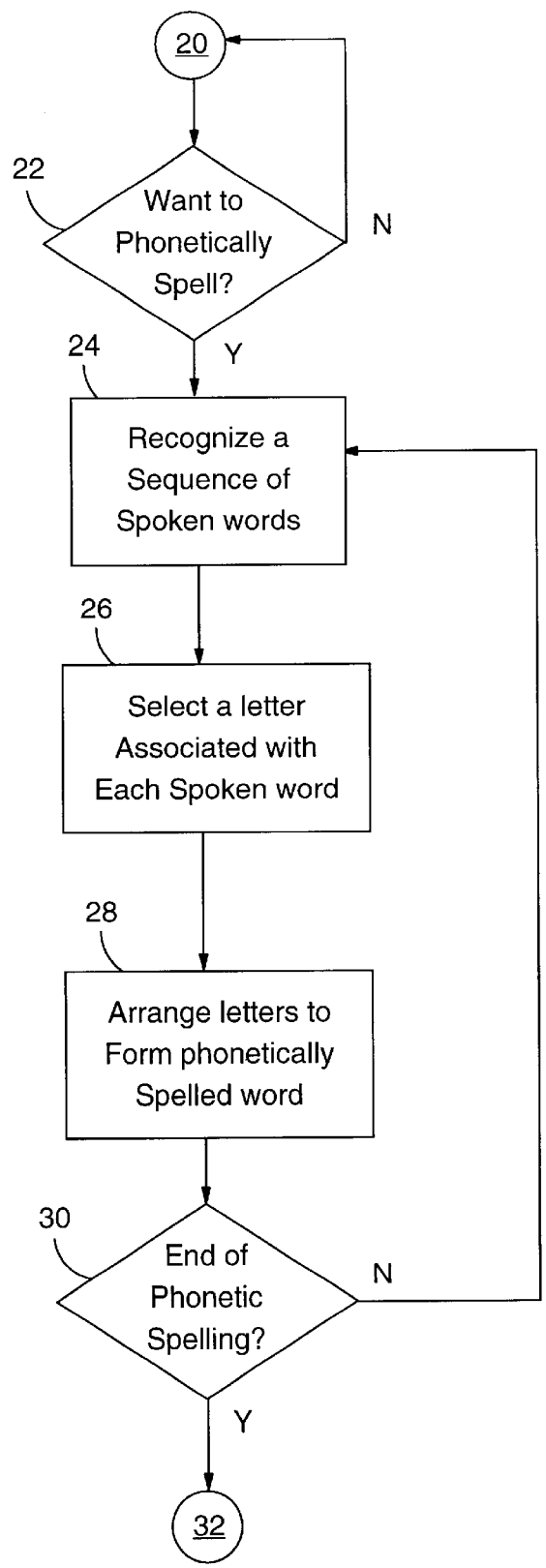
FIG. 2 is a flowchart showing the steps of an embodiment of the present invention.

In FIG. 2 there is shown a flowchart of the method steps of an embodiment of the invention. Starting at position 20, the method determines in step 22 when a speaker wants to phonetically spell a first word. As noted above there are many ways known in the art for carrying out step 22 including recognizing specific sequence words, pressing a key on a keyboard, clicking a mouse and touching a screen or touch sensitive switch. In step 24 a sequence of spoken words are recognized. Recognition of spoken words may be carried out by conventional speech recognition apparatus known in the art. For example, an IBM Corporation product, Via Voice™ or Dragon Dictate™ from Dragon Systems, Inc. 320 Nevada Street, Newton, Mass. 02160 may be used.

A letter associated with each word or series of words is selected in step 26 and the letters are arranged in step 28 to spell the first word. This may also include a step for indicating the end of phonetic spelling as shown in step 30. If that indication is given then the method goes to the stop position 32.

Figure 3:
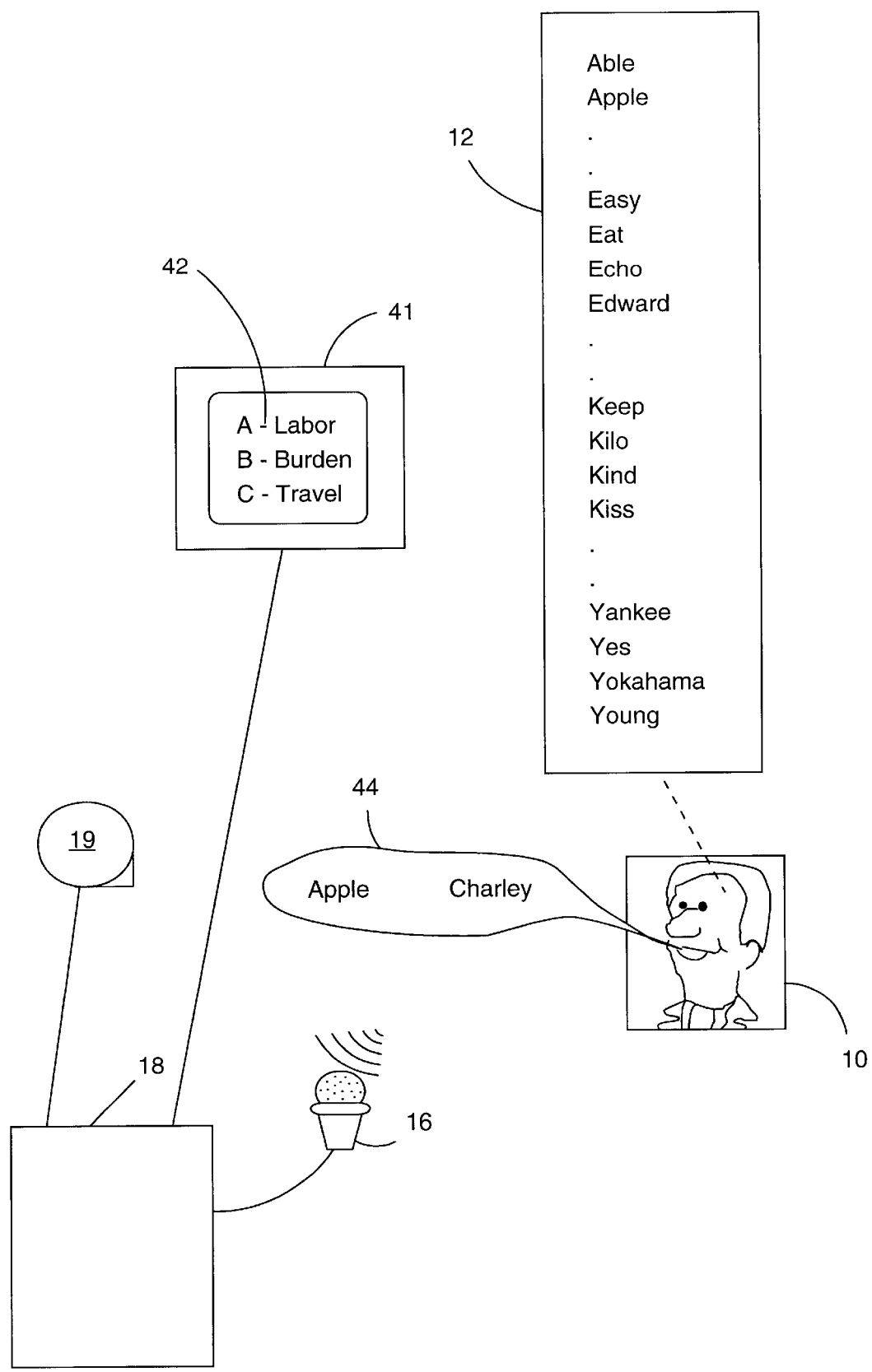
FIG. 3 depicts another embodiment for selecting items from a list.

In FIG. 3 there is shown an apparatus for selecting items from a list 42. Processor 18 displays the list 42 on a computer display 41 which may be any type of visual display such as a cathode ray tube, liquid crystal display, or other workstation display hardware. Each item on list 42 has a designated letter. For example a list of accounting items such as labor, burden, and travel expenses as shown in FIG. 3 may be preceded by A for labor, B for Burden, and C for travel. Speaker 10 can view list 42 on display 41 and select items by speaking words 44 selected from a vocabulary 12 of recognizable words. Processor 18 includes apparatus for recognizing the words spoken such as by running a speech recognition program which picks up the spoken words on microphone 16 attached to processor 18. Processor 18 may also include specially designed hardware for speech recognition or any combination of hardware and software capable of recognizing more than 26 spoken words. The software may be stored as a computer program product on a computer readable medium 19 such as a CD-ROM disk, floppy disk, hard drive, magnetic tape or other medium known in the art for storage. Medium 19 may be read directly by processor 18 activating a reader device such as a CD-ROM drive or by a processor 18 requesting a remote device to read medium 19.

Processor 18 recognizes the spoken words, for example APPLE CHARLEY as shown in FIG. 3 and includes hardware for selecting a letter associated with each word that is said. The associated letter may be the first letter of the word. Processor 18 also selects those items from list 42 for which their designated letter matches an associated letter. Such hardware is well known but may include a processor for executing software instructions for making the match and may also include storage devices, RAM and ROM for maintaining lists of associated letters.

While there have been shown and described what at present considered the preferred embodiments of the invention, it will be obvious to those skilled in the art that various changes and notifications may be made therein without departing from the scope of the invention as defined by the appended claims.

What is claimed is:

1. A speech recognition apparatus, comprising:
   means for determining when a speaker gives an indication of a desire to phonetically spell a first word;
   means for recognizing a sequence of words selected from a vocabulary and spoken by said speaker after said indication and wherein said vocabulary includes all of the words which said means for recognizing a sequence of words is capable of recognizing at the time said speaker gives said indication;
   means for selecting a letter associated with each of said spoken words; and
   means for arranging said letters to form said first word.

2. The apparatus of claim 1, wherein said indication is a specific sequence of spoken words.

3. The apparatus of claim 1, wherein said letter is the first letter of each of said words spoken by said speaker after said indication.

4. The apparatus of claim 1, wherein said means for selecting a letter associated with each of said spoken words includes means for selecting a single letter associated with a series of spoken words.

5. The apparatus of claim 4, wherein said series of spoken words comprises a desired letter name, followed by the words, AS IN, or, LIKE IN, and thereafter followed by a word beginning with said desired letter.

6. The apparatus of claim 1, where said means for arranging said letters, arranges said letters in the order that said words spoken by said speaker after said indication are spoken.

7. The apparatus of claim 1, further including means for indicating the end of phonetic spelling.

8. A speech recognition apparatus, comprising:
   a display for showing items on a list, each said item having a designated letter;
   means for recognizing one or more words selected from a vocabulary and spoken by a speaker and wherein said vocabulary includes all of the words which said means for recognizing a sequence of words is capable of recognizing at the time said speaker gives said indication;
   means for selecting a letter associated with each of said one or more words; and
   means for selecting said items on said list for which said designated letter matches said letter associated with each of said one or more words.

9. The apparatus of claim 8 wherein a single letter is associated with a series of said words spoken by said speaker.

10. The apparatus of claim 9 wherein said series of spoken words comprises a selected letter mane followed by the words AS IN, or LIKE IN, and thereafter followed by a word beginning with said selected letter.

11. A method for recognizing speech, comprising the steps of:

determining when a speaker gives an indication of a desire to phonetically spell a first word;

utilizing means for recognizing a sequence of words to recognize a sequence of words selected from a vocabulary and spoken by said speaker after said indication and wherein said vocabulary includes all of the words which said means for recognizing a sequence of words is capable of recognizing at the time said speaker gives said indication;

selecting a letter associated with each of said spoken words; and arranging said letters to form said first word.

12. The method of claim 11, wherein said determining comprises recognizing a specific sequence of spoken words.

13. The method of claim 11, wherein said selecting a letter further comprises selecting the first letter of each of said spoken words.

14. The method of claim 11, wherein said selecting a letter further comprises selecting a single letter associated with a series of spoken words.

15. The method of claim 14, wherein said series of spoken words comprises a desired letter name, followed by the words, AS IN, or, LIKE IN, and thereafter followed by a word beginning with said desired letter.

16. The method of claim 11, wherein said arranging said letters further comprises arranging said letters in the order that said words spoken by said speaker after said indication, are spoken.

17. The method of claim 11, further comprising indicating the end of said phonetic spelling.

18. A method of recognizing speech, comprising the steps of:

displaying items on a list, each said item having a designated letter;

utilizing means for recognizing a sequence of words to recognize one or more words selected from a vocabulary and spoken by a speaker and wherein said vocabulary includes all of the words which said means for recognizing a sequence of words is capable of recognizing at the time said speaker gives said indication;

selecting a letter associated with each of said one or more words; and selecting said items on said list for which said designated letter matches said letter associated with each of said one or more words.

19. A computer program product for instructing a processor to recognize speech, comprising:

a computer readable medium;

first program instruction means for instructing a processor to determine when a speaker gives an indication of a desire to phonetically spell a first word;

second program instruction means for instructing a processor to recognize a sequence of words selected from a vocabulary and spoken by said speaker after said indication and wherein said vocabulary includes all of the words which said means for instructing a processor to recognize sequence of words is capable of recognizing at the time said speaker gives said indication;

third program instruction means for instructing a processor to select a letter associated with each of said spoken words, and fourth program instruction means for instructing a processor to arrange said letters to form said first word; and wherein said program instruction means are recorded on said medium.

20. The computer program product as set forth in claim 19, wherein said indication is a specific sequence of spoken words.

21. The computer program product as set forth in claim 19, wherein said letter is the first letter of each of said words spoken by said speaker after said indication.

22. The computer program product as set forth in claim 19, wherein said third program instruction means for instructing a processor to select a letter includes instructing a processor to select a single letter associated with a series of spoken words.

23. The computer program product as set forth in claim 19, further comprising:

fifth program instruction means for instructing a processor to recognize the indication of the end of phonetic spelling; and wherein said fifth program instruction means is recorded on said medium.

24. A computer program product for instructing a processor to recognize speech, comprising:

a computer readable medium;

first program instruction means for displaying items on a list, each said item having a designated letter;

second program instruction means for recognizing one or more words selected from a vocabulary and spoken by a speaker and wherein said vocabulary includes all of the words which said means for recognizing a sequence of words is capable of recognizing at the time said speaker gives said indication;

third program instruction means for selecting a letter associated with each of said one or more words; and fourth program instruction means for selecting said items on said list for which said designated letter matches said letter associated with each of said one or more words; and wherein said program instruction means are recorded on said medium.

* * * * *